US012746924B2

(12) United States Patent
Cucciolla et al.

(10) Patent No.: US 12,746,924 B2
(45) Date of Patent: Sep. 29, 2026

(54) ROAD VEHICLE IMPLEMENTING A LAUNCH CONTROL PROCEDURE AND CORRESPONDING CONTROL METHOD

(71) Applicant: FERRARI S.P.A., Modena (IT)

(72) Inventors: Giorgio Cucciolla, Modena (IT); Flavio Gargiulo, Modena (IT); Maximilian Romani, Modena (IT)

(73) Assignee: FERRARI S.P.A., Modena (IT)

( * ) Notice: Subject to any disclaimer, the term of this patent is extended or adjusted under 35 U.S.C. 154(b) by 0 days.

(21) Appl. No.: 19/098,076

(22) Filed: Apr. 2, 2025

(65) Prior Publication Data

US 2025/0313205 A1 Oct. 9, 2025

(30) Foreign Application Priority Data

Apr. 5, 2024 (IT) ........................ 102024000007645

(51) Int. Cl.
*B60W 30/18* (2012.01)
*B60K 35/10* (2024.01)

(52) U.S. Cl.
CPC ....... *B60W 30/18027* (2013.01); *B60K 35/10* (2024.01); *B60W 2540/10* (2013.01); *B60W 2540/12* (2013.01)

(58) Field of Classification Search
CPC ....... B60W 30/18027; B60W 2540/10; B60W 2540/12; B60K 35/10; B60K 2360/128; B60K 2360/167; B60K 2360/332; B60K 2360/345; B60K 2360/771; B60K 35/21; B60K 26/02; B60Q 3/80; B60Q 9/00
See application file for complete search history.

(56) References Cited

U.S. PATENT DOCUMENTS

2015/0266479 A1* 9/2015 Blakeway ....... B60W 30/18027 477/92
2020/0312582 A1* 10/2020 R ........................... H01H 9/161

FOREIGN PATENT DOCUMENTS

DE 102019005544 A1 3/2020

OTHER PUBLICATIONS

How to: Using Launch Control in your BMW M with M Steptronic Transmission with Drivelogic. Jul. 27, 2021. Downloaded from the Internet Oct. 29, 2024, URL: https://www.youtube.com/watch?v=hGarhQ7D0nw.
Italian Search Report and Written Opinion dated Oct. 29, 2024 for Italian Application No. 202400007645 filed Apr. 5, 2024, 7 pages.

* cited by examiner

*Primary Examiner* — Brian P Sweeney
(74) *Attorney, Agent, or Firm* — CANTOR COLBURN LLP

(57) ABSTRACT

A road vehicle having: a passenger compartment delimited by a roof at the top; at least one front seat arranged in the passenger compartment; an accelerator pedal; a brake pedal; a control unit, which implements a launch control procedure; and a manual control, which is can be operated to carry out the activation of the launch control procedure and is arranged on the roof.

19 Claims, 5 Drawing Sheets

ROAD VEHICLE IMPLEMENTING A LAUNCH CONTROL PROCEDURE AND CORRESPONDING CONTROL METHOD

CROSS-REFERENCE TO RELATED APPLICATIONS

This patent application claims priority from Italian patent application no. 102024000007645 filed on Apr. 5, 2024, the entire disclosure of which is incorporated herein by reference.

TECHNICAL FIELD

The invention relates to a road vehicle implementing a launch control procedure and to a corresponding control method.

PRIOR ART

In a modern high-performance sports car, there normally is a launch control procedure that allows drivers to maximize the performances of a standing start optimizing the behaviour of the car to transmit as much torque as possible to the ground (i.e. to increase the drive), preparing the propulsion system to deliver maximum power and, if necessary, temporarily increasing the maximum power that can be delivered by means of an overboost of the propulsion system.

During the launch control procedure, drivers only have to keep the accelerator pedal fully pressed without having to worry about anything other than checking the position of the steering wheel; generally, the launch control procedure is automatically disabled as soon as the driver releases the pressing of the accelerator pedal or presses the brake pedal.

In cars currently available in the market, the activation of the launch control procedure involves pressing a button that is generally located in the dashboard or in the central tunnel and then fully pressing the brake pedal first and subsequently the accelerator pedal; at this point, the launch control procedure is activated and, in order to start it, drivers simply have to release the brake pedal while keeping the accelerator pedal fully pressed (all the way down).

However, in modern cars, the dashboard and the central tunnel generally are rich in buttons and other types of controls and, therefore, identifying the button that activates the launch control procedure can take a relatively long time and requires drivers to take their attention away from the road ahead of the car in order to look at the dashboard and at the tunnel.

In addition, the activation of the launch control procedure is generally signalled by illuminating the button that activates the launch control procedure with a different colour (for example, from white to amber) and by lighting a warning light in the control panel (alternatively, by displaying a letter or a writing on a screen of the control panel); however, checking for the lighting of this warning light or the illumination of the button that activates the launch control procedure requires carefully looking at the control panel, the dashboard or the central tunnel, thus taking the drivers' attention away from the road ahead of the car.

Basically, in known cars, the activation of the launch control procedure is relatively poorly ergonomic and slow and this can be a problem as the launch control procedure is used when drivers want to achieve maximum performances and, hence, when drivers need to be completely focused on driving.

Patent application US2015266479A1 discloses a launch control unit configured to activate a revised shift control strategy; in use, the control unit activates the revised shift control strategy upon receipt of a torque demand greater than or equal to an upper torque threshold within a predefined time period from receipt of a brake signal smaller than or equal to a lower brake threshold.

Patent application DE102019005544A1 discloses a keyboard integrated in a covering part of a vehicle and comprising a series of buttons.

Patent applications US2019070957A1 and US2015199041A1 disclose a car in which a manual control for the activation of hazard warning flashers is arranged on the roof that delimits the passenger compartment at the top.

Patent application US2020312582A1 discloses a car in which a button panel for opening/closing the windows and for adjusting the rear-view mirrors is arranged on the roof that delimits the passenger compartment at the top.

DESCRIPTION OF THE INVENTION

The object of the invention is to provide a road vehicle implementing a launch control procedure and a corresponding control method, which allow the launch control procedure to be activated in a quick, simple and ergonomic manner.

A further object of the invention is to provide a road vehicle implementing a launch control procedure and a corresponding control method, which allow manufacturers to signal the activation of the launch control procedure in an ergonomic manner without distracting the driver from the road ahead of the road vehicle.

According to the invention, there are provided a road vehicle implementing a launch control procedure and a corresponding control method as claimed in the appended claims.

The appended claims describe preferred embodiments of the invention and form an integral part of the description.

BRIEF DESCRIPTION OF THE DRAWINGS

The invention will now be described with reference to the accompanying drawings, which show some non-limiting embodiments thereof, wherein.

PREFERRED EMBODIMENTS OF THE INVENTION

Figure 1:
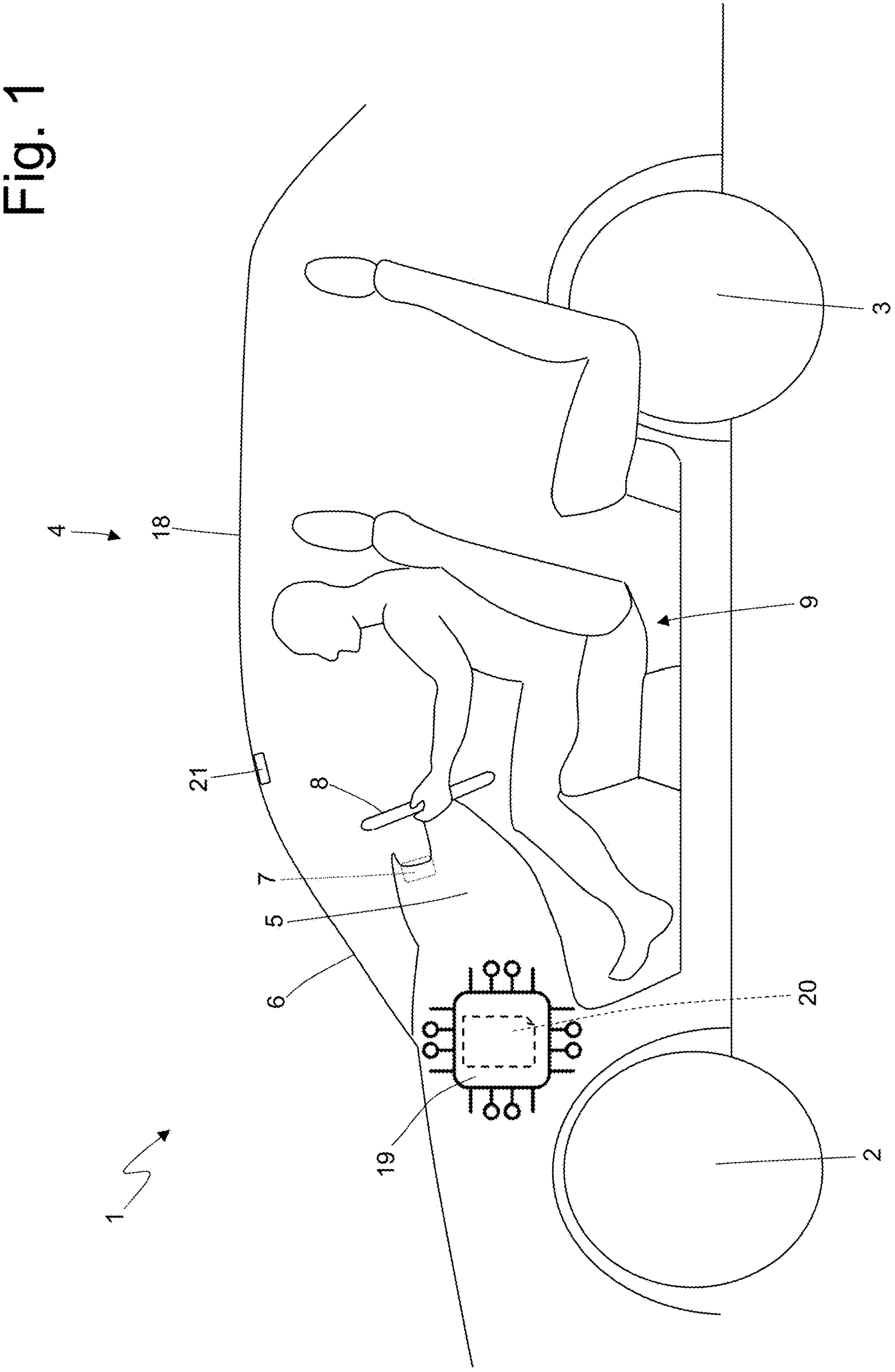
FIG. 1 is a schematic side view of a road vehicle implementing a launch control procedure.

In FIG. 1, number 1 indicates, as a whole, a road vehicle (in particular, a car) provided with two steering front driven wheels 2 and with two rear drive wheels 3, which receive the torque from a powertrain system (alternatively, all four wheels 2 and 3 could be drive wheels or the sole front wheels 2 could be drive wheels).

According to FIG. 1, the road vehicle 1 comprises a passenger compartment 4 delimited, at the front, by a dashboard 5, which is arranged under a windshield 6. The dashboard 5 supports a control panel 7, which is arranged in front of the driver immediately behind a steering wheel 8. Inside the passenger compartment 4 there are two front seats 9 (only one of them is visible in FIG. 1), which are located in front of the dashboard 5: a front seat 9 is intended for the driver and, therefore, is located in front of the steering wheel 8, while the other front seat 9 is intended for a (possible) passenger.

Figure 2:
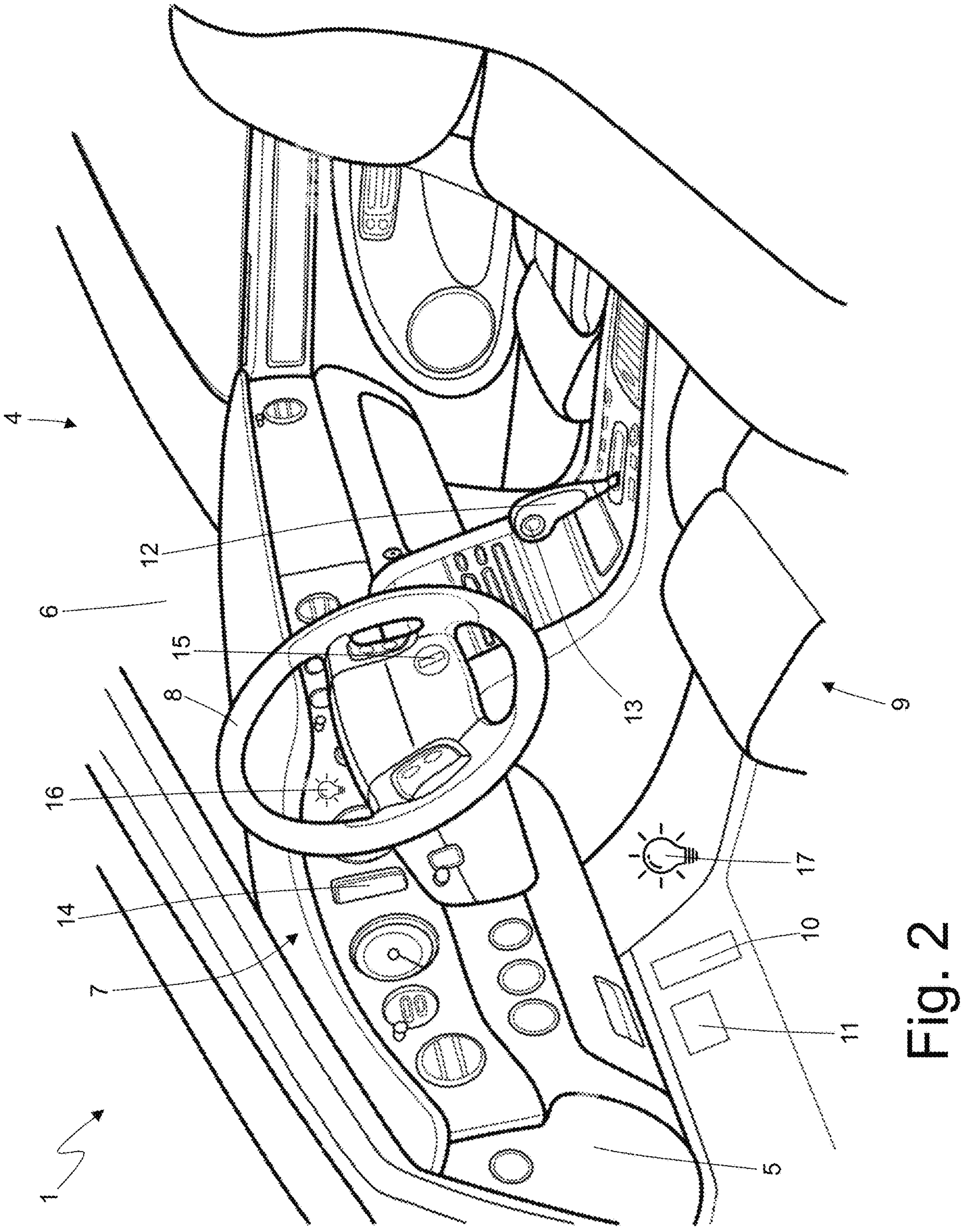
FIG. 2 is a schematic perspective of a passenger compartment of the road vehicle of FIG. 1.

According to FIG. 2, an accelerator pedal 10 and a brake pedal 11 are arranged in front of the driver's seat 9.

According to FIG. 2, in a central tunnel there is a control 12 for the transmission, which allows drivers to select the type of operating mode, which generally includes a "Park" option for blocking the transmission, a "Drive" option for forward motion with automatic gear management, a "Neutral" option for setting the transmission to neutral, a "Rear" option for reverse motion, and a "Manual" option for forward motion with manual gear management. The transmission control 12 is provided with a light indicator 13, which can be illuminated with different colours to indicate the operating mode that was selected through the transmission control 12.

According to FIG. 2, the control panel 7 comprises, among other things, a screen 14 showing the operating mode was selected through the transmission control 12; in particular, the screen 14 shows the word "Drive" when, through the transmission control 12, the driver selected the "Drive" option for forward motion with automatic gear management.

The road vehicle 1 is provided with a selector 15 (also known as "hand lever"), which is preferably arranged on the steering wheel 8 and allows the driver to choose the preferred driving style, namely a more comfort-oriented style or a more fun/sports-oriented style; in other words, the selector 15 has different positions, for example corresponding to sports, performance, city, highway, wet driving modes.

The control panel 7 has a backlighting system 16 (schematically shown in FIG. 2); in case of a fully digital control panel 7 (namely, only consisting of one or more screens), the backlighting system 16 is integrated in the screens and is created with the background colour of the screens.

The passenger compartment 4 comprises an ambient lighting system 17 (schematically shown in FIG. 2), which generates a soft light throughout the passenger compartment 4.

According to FIG. 1, the passenger compartment 4 is delimited at the top by a roof 18 (more or less horizontal), which constitutes the highest part of the road vehicle 1 (namely, the part furthest from the road surface).

The road vehicle 1 is provided with a control unit 19, which, among other things, implements a launch control procedure 20 that allows drivers to maximize the performances of a standing start optimizing the behaviour of the road vehicle 1 to transmit as much torque as possible to the ground (i.e. to increase the drive), preparing the propulsion system to deliver maximum power and, if necessary, temporarily increasing the maximum power that can be delivered by means of an overboost of the propulsion system.

The road vehicle 1 comprises a manual control 21 for the activation of the launch control procedure 20.

The manual control 21 is arranged (mounted) on the roof 18 delimiting the passenger compartment 4 at the top, namely it is located above the front seats 9 and is preferably arranged between the two front seats 9 (in the middle of the two front seats 9) so that it can easily be reached by the driver's right hand (in case of left-hand traffic, the driver's left hand in case of right-hand traffic) with a natural upward movement of the right hand that does not require contortions.

According to a preferred embodiment, the manual control 21 is configured to be activated by means of a vertical movement from the top to the bottom; namely, in order to activate the launch control procedure 20, it is necessary to apply (among other things and as described below) a vertical movement from the top to the bottom to the manual control 21 (i.e., the manual control 21 must be pulled down).

According to FIGS. 3-6, the manual control 21 comprises a support 22 having a seat 23, which has the shape of a parallelepiped and has a central symmetry axis 24, which is oriented (approximately) vertically or perpendicularly to the roof portion 18 located in the area of the manual control 21. Furthermore, the manual control 21 comprises a control body 25, which has the shape of a parallelepiped, positively reproduces the shape of the seat 23 of the support 22 and is housed in the seat 23 so as to be moved between a deactivated position (shown in FIGS. 3 and 5), in which the launch control procedure 20 cannot be activated, and an active position (shown in FIGS. 4 and 6), in which the launch control procedure 20 can be activated.

As mentioned above, the control body 25 translates linearly (in particular axially, namely along the axis of symmetry 24, which is oriented vertically) between the deactivated position (shown in FIGS. 3 and 5), in which the control body 25 is completely inserted in the seat 23, and the active position (shown in FIGS. 4 and 6), in which the control body 25 is (at least) partially extracted from the seat 23.

Figure 4:
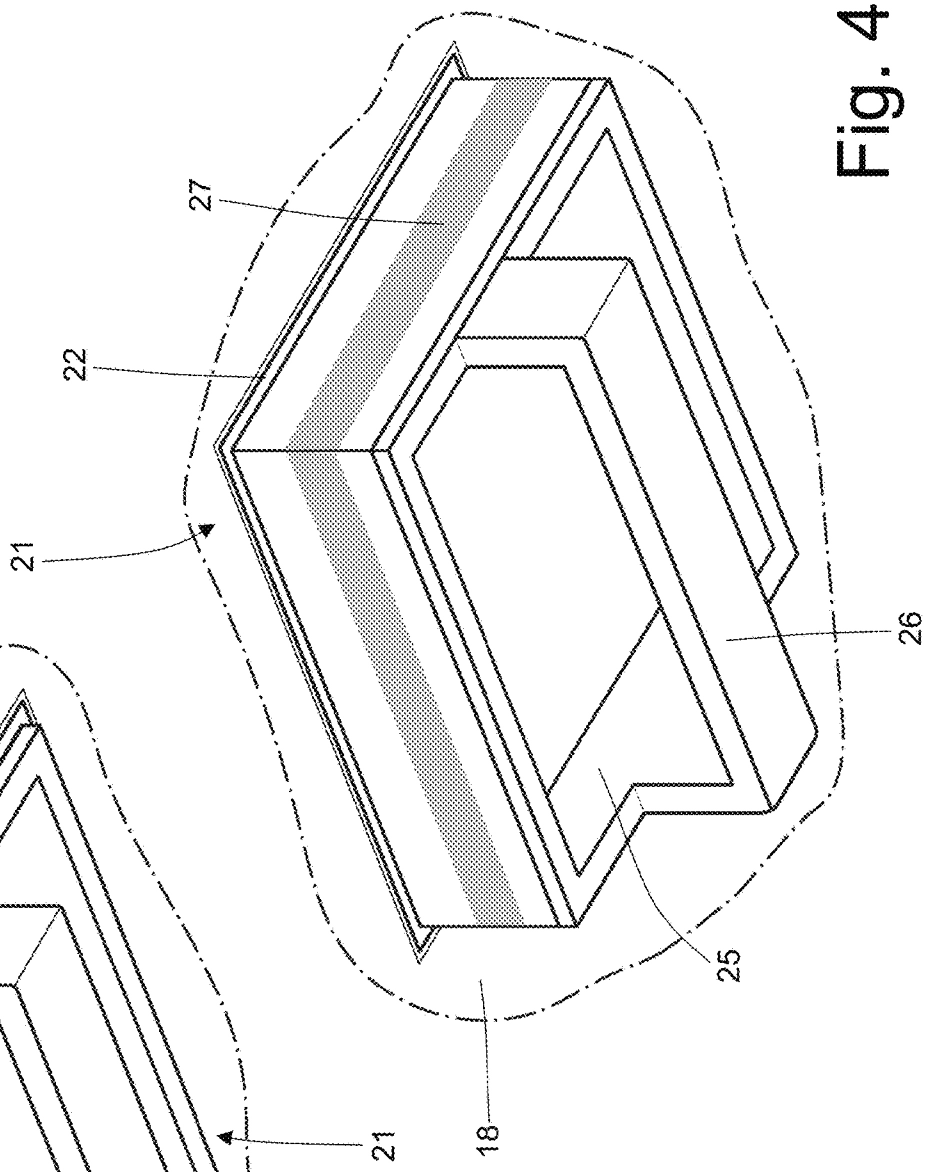
FIGS. 3 and 4 are two perspective views of a manual control for activating the launch control procedure in a deactivated position and in an active position, respectively.
Figure 6:
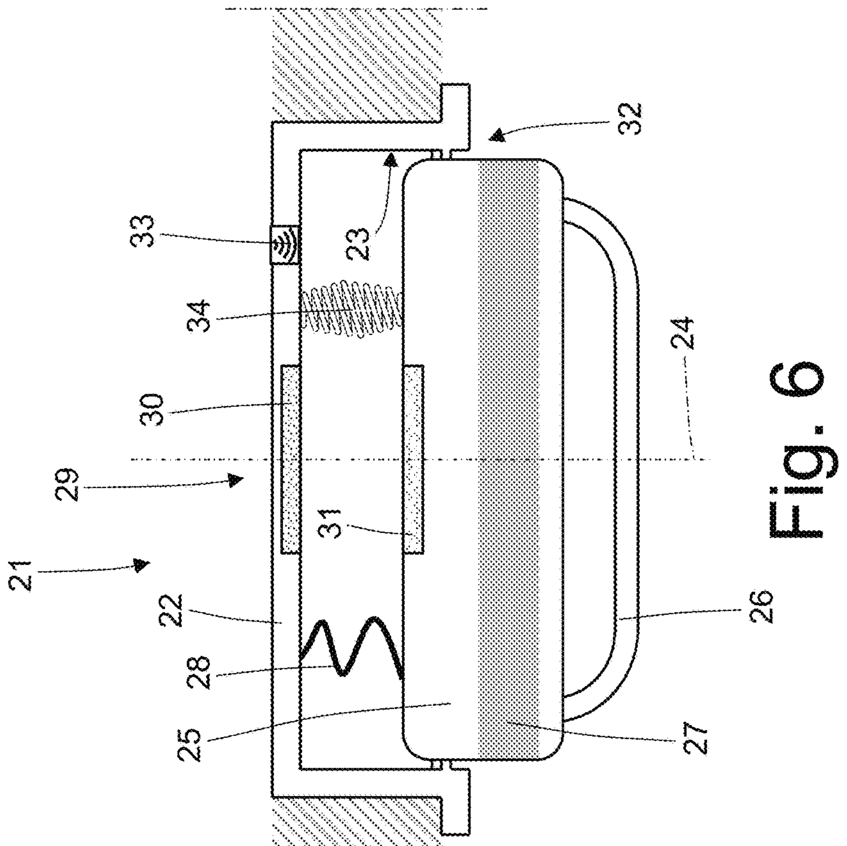
FIGS. 5 and 6 are two schematic longitudinal section views of the manual control of FIGS. 3 and 4 in the deactivated position and in the activated position, respectively.

According to a preferred embodiment, the control body 25 comprises a handle 26, which can be gripped, protrudes downwards (namely, towards the passenger compartment 4) and can be pulled to extract the control body 25 from the seat 23 and, hence, move the control body 25 from the deactivated position (shown in FIGS. 3 and 5) to the active position (shown in FIGS. 4 and 6).

According to a preferred embodiment, the control body 25 comprises a light element 27, which is arranged in the area of a side wall of the control body 25 and is on the outside of the seat 23 only when the control body 25 is in the active position (shown in FIGS. 4 and 6) and is (at least) partially extracted from the seat 23. In other words, when the control body 25 is in the deactivated position (shown in FIGS. 3 and 5), the light element 27 is completely hidden inside the seat 23 (and, hence, is kept switched off), while the light element 27 becomes visible, leaving the seat 23, only when the control body 25 is in the active position (shown in FIGS. 4 and 6) and is (at least) partially extracted from the seat 23. Obviously, the light element 27 is switched on to emit light (typically orange light) only when the control body 25 is in the active position (shown in FIGS. 4 and 6) and is (at least) partially extracted from the seat 23 and its function is to indicate that the launch control procedure 20 can be activated.

According to a preferred embodiment, the light element 27 has an annular shape completely surrounding (namely, at) 360° the control body 25.

Figure 3:
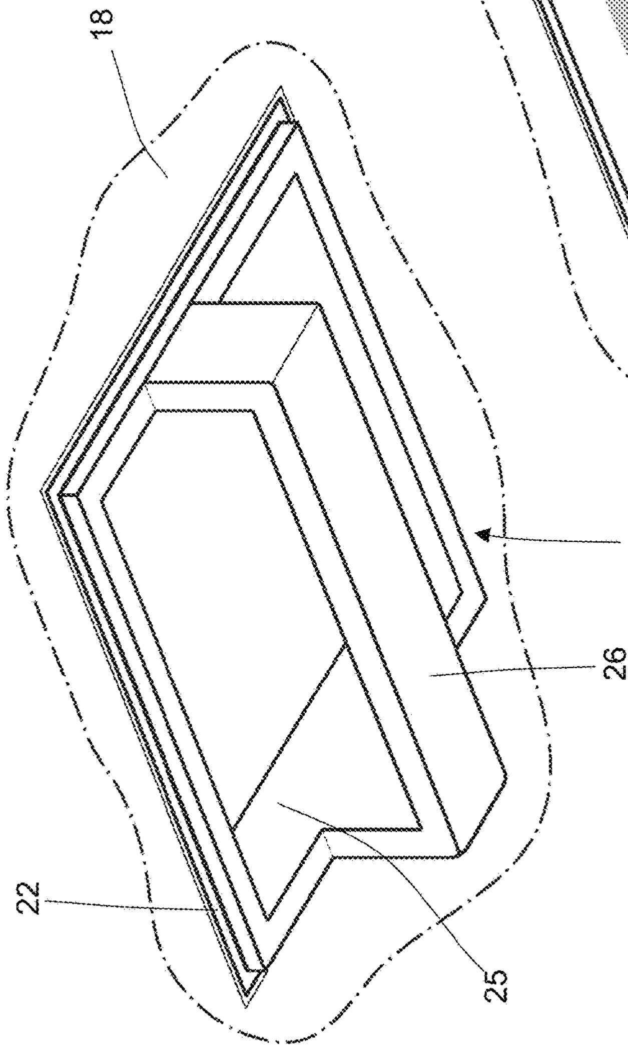
Figure 5:
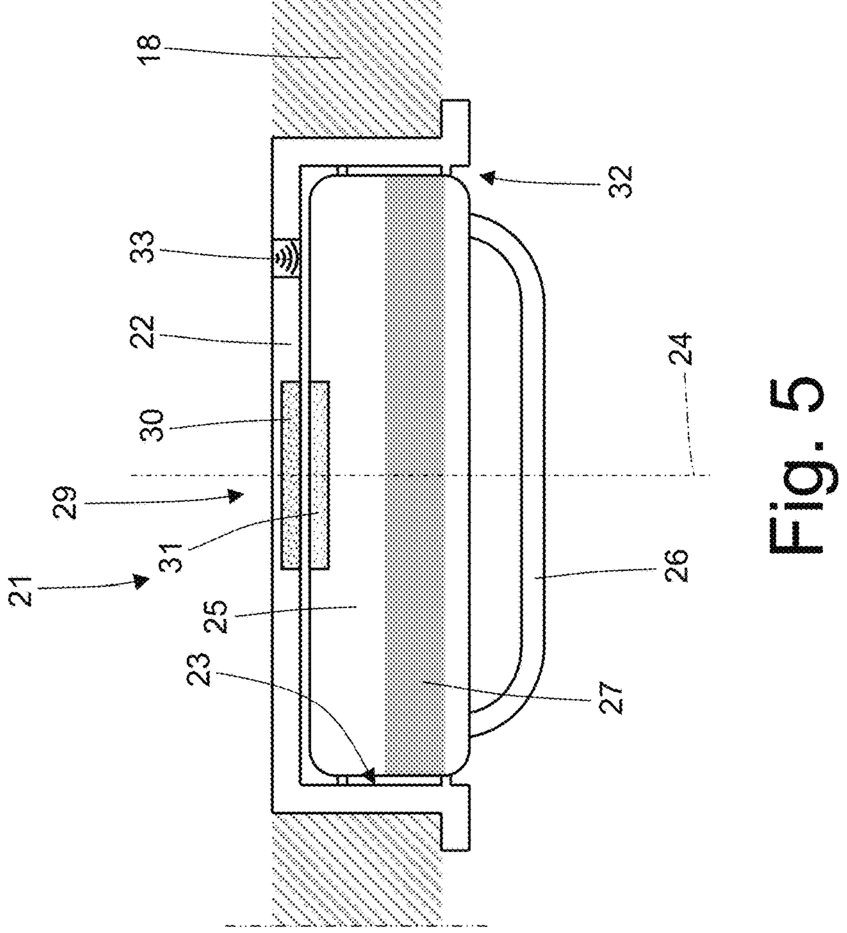

According to a different embodiment that is not shown herein, the light element 27 is arranged in the area of a base wall of the control body 25 and, therefore, is always visible, even when the control body 25 is in the deactivated position (shown in FIGS. 3 and 5).

According to a possible embodiment shown in FIG. 5, a spiral-shaped power supply wire 28 is provided, which connects the support 22 to a rear wall of the control body 25 to power to the light element 27 carried by the control body 25.

According to a preferred embodiment, the manual control 21 comprises a holding system 29, which holds the control body 25 in the deactivated position (shown in FIGS. 3 and 5) with a predetermined force. For example, the holding system 29 could be of the magnetic type and could comprise a permanent magnet 30 arranged in the support 22 and a corresponding permanent magnet 31 arranged in a rear wall of the control body 25 so as to face the permanent magnet 30 and be in close proximity to the permanent magnet 30 when the control body 25 is in the deactivated position (shown in FIGS. 3 and 5); the two permanent magnets 30 and 31 are arranged so as to have opposite magnetic poles in order to attract one another. Obviously, one of the two permanent magnets 30 and 31 could be replaced by a simple piece of ferromagnetic metal. Alternatively, the holding system 29 could be of the mechanical type and, hence, comprise, for example, a reversible snap clip.

According to a preferred embodiment, the manual control 21 comprises a limit stop 32, which limits the maximum extraction of the control body 25 from the seat 23 when the control body 25 is in the active position (shown in FIGS. 4 and 6). For example, the limit stop 32 could comprise a circumferential: protrudes outwards from the control body 25, and a similar circumferential rib, which protrudes inwards from the seat 23 to impact on the circumferential rib of the control body 25 when the control body 25 reaches the maximum extraction possible from the seat 23.

According to a preferred embodiment, the manual control 21 comprises a sensor 33 (for example, a proximity sensor), which detects the position of the control body 25 inside the seat 23 and, hence, is able to determine whether or not the control body 25 is in the deactivated position (shown in FIGS. 3 and 5); when the control body 25 is not in the deactivated position (shown in FIGS. 3 and 5), it is assumed that the control body 25 is in the active position (shown in FIGS. 4 and 6).

According to a preferred embodiment, the manual control 21 comprises an elastic element, which pushes the control body 25 towards the deactivated position (shown in FIGS. 3 and 5) and is deformed by the driver, when the driver applies a force to the control body 25, in order to move the control body 25 from the deactivated position (shown in FIGS. 3 and 5) to the active position (shown in FIGS. 4 and 6).

As mentioned above, the seat 23 and the control body 25 both have the shape of a parallelepiped; according to a different embodiment that is not shown herein, the seat 23 and the control body 25 both have a cylindrical shape. When the seat 23 and the control body 25 both have a cylindrical shape and according to a possible embodiment, the control body 25 can rotate inside the seat 23 and around the symmetry axis 24, whereas, according to an alternative embodiment, there are mechanical locks (for example, a rib of the seat 23, which is oriented axially and engages a slit of the control body 25), which prevent the control body 25 from rotating inside the seat 23 and around the symmetry axis 24.

According to a preferred embodiment, the manual control 21 is collapsible with a calibrated and relatively small resistance to collapse, so that, in the event of a possible impact against the head of a passenger following a frontal crash, the manual control 21 collapses without constituting an (excessive) danger for the user's head. In other words, in the event of an impact, the control body 25 (which is the "protruding" element of the manual control 21) can completely go back into the seat 23 with little effort. To this regard, according to a preferred embodiment, the manual control 21 has, on the outside, only rounded parts, which have no sharp edges at all.

According to other embodiments that are not shown herein, the seat 23 and the control body 25 could have shapes other than the parallelepiped shape and the cylindrical shape.

Owing to the above, it is evident that the support 22 is configured to be preferably mounted (more or less) horizontally on the roof 18 of the passenger compartment 4, so that the control body 25 linearly translates between the deactivated position and the active position by means of a (more or less) vertical movement from the top to the bottom.

Figure 8:
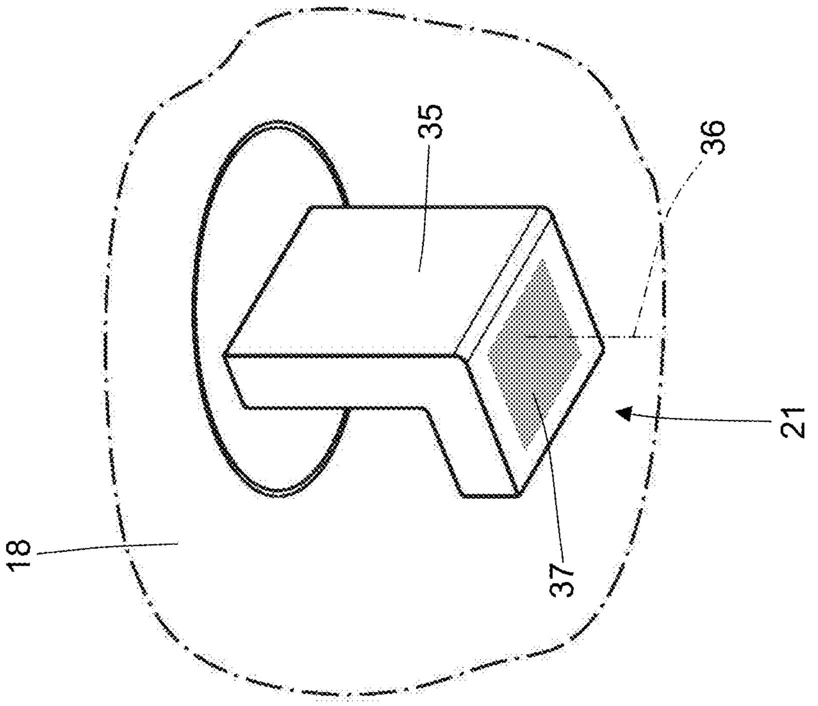
FIGS. 7 and 8 are two perspective views of further embodiments of the manual control for the activation of the launch control procedure.
Figure 7:
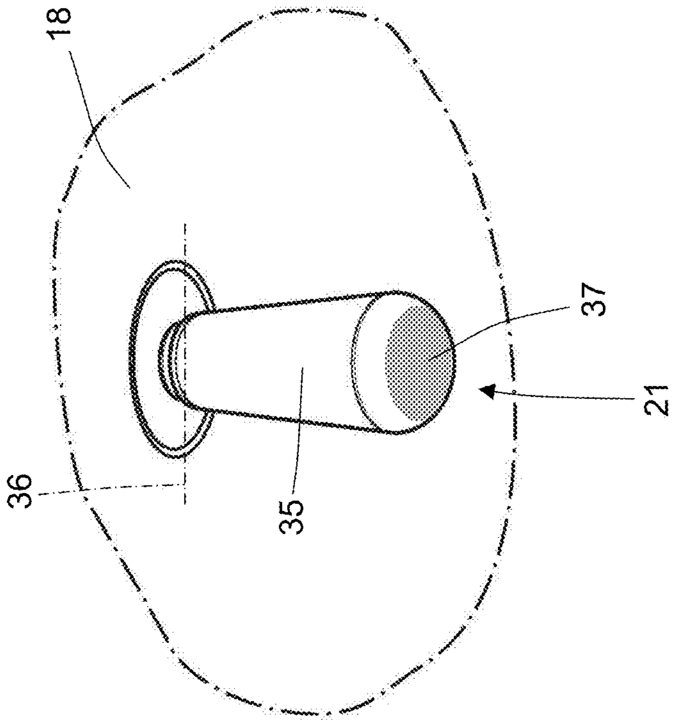

In the alternative embodiment shown in FIGS. 7 and 8, the manual control 21 comprises a lever 35, which is hinged so as to rotate around a rotation axis 36 between the deactivated position and the active position. In the embodiment shown in FIG. 7, the rotation axis 36 is horizontal (namely, parallel to the plane defined by the roof 18 of the passenger compartment 4), whereas, in the embodiment shown in FIG. 8, the rotation axis 36 is vertical (namely, perpendicular to the plane defined by the roof 18 of the passenger compartment 4). In the embodiments shown in FIGS. 7 and 8, the lever 35 supports a light element 37.

Described below are the methods for activating the launch control procedure 20 or the methods for causing the road vehicle 1 to start running following the launch control procedure 20, which maximizes performances (namely, allows the vehicle to accelerate from a standstill in the shortest time possible) fully exploiting the potential of the road vehicle 1.

The first requirement for the activation of the launch control procedure 20 is, of course, that the road vehicle 1 is standing still; namely, the launch control procedure 20 can only be activated when the road vehicle 1 is standing still.

When the road vehicle 1 is standing still, in order to activate the launch control procedure 20, the driver must initially press the brake pedal 11 all the way down and, once the brake pedal 11 has been pressed (and is kept pressed), the driver must act upon the manual control 21 (pulling down the manual control 21 as described above), maintaining the action upon the manual control 21 for a predetermined amount of time (for example, at least 3 seconds). Once the driver, with the road vehicle 1 standing still and the brake pedal 11 pressed, has activated the manual control 21 for the predetermined amount of time (namely, for at least 3 consecutive seconds), the launch control procedure 20 is activated. At this point, the driver, always keeping the brake pedal 11 pressed, must fully press (and keep pressed) the accelerator pedal 10 (thus completing the activation of the launch control procedure 20) and subsequently start the launch control procedure 20 by releasing the brake pedal 11, always keeping the accelerator pedal 10 pressed all the way down (hence, by releasing the brake pedal 11, the road vehicle 1 begins to accelerate, generating the maximum acceleration possible). Once started, the launch control procedure 20 stops as soon as the driver touches the brake pedal 11 or releases the pressure on the accelerator pedal 10 (namely, stops pressing the accelerator pedal 10 all the way down).

According to a preferred embodiment, the launch control procedure 20 can be activated (by performing the operations described above) only if the performance mode is selected in the selector 15; namely, in all other modes other than the performance mode, the execution of the operations described above does not allow the launch control procedure 20 to be activated.

When the launch control procedure 20 is activated (namely, as soon as the activation of the launch control procedure 20 has been completed), the control unit 19 signals the activation to the driver by means of different visual signalling modes: the light indicator 13 of the transmission control 12 changes colour from white to orange (or another colour having a warm tone), the word "Drive" displayed on the screen 14 changes colour from white to orange (or another colour having a warm tone), the light element 27 or 37 of the manual control 21 changes colour from white to orange (or another colour having a warm tone), the backlight of the control panel 7 changes colour becoming orange (or another colour having a warm tone), and the ambient light of the passenger compartment 4 changes colour becoming orange (or another colour having a warm tone). According to other embodiments, the activation of the launch control procedure 20 is signalled to the driver using only part of the above-listed visual signalling modes, namely performing only part of the above-listed colour changes.

The embodiments described herein can be combined with one another, without for this reason going beyond the scope of protection of the invention.

The road vehicle 1 described above has numerous advantages.

In the road vehicle 1 described above, the activation of the launch control procedure 20 takes place in a quick, simple and ergonomic manner. Indeed, in order to activate the launch control procedure 20, the driver must simply raise his/her right hand and grope for the manual control 21 (namely, by feeling the roof 18), always keeping the eyes on the road ahead of the road vehicle 1; on the roof 18 there is the sole manual control 21 (all around the manual control 21, the roof 18 is perfectly smooth), so that, even by groping, the driver safely and very quickly identifies the position of the manual control 21 with his/her right hand. Furthermore, the manual control 21 described above has a very intuitive implementation, since once the driver's right hand has found the handle 26 of the manual control 21, it has to do nothing more than pull the handle 26 of the manual control 21 downwards.

In the road vehicle 1 described above, the activation of the launch control procedure 20 is signalled to the driver without distracting the driver from the road ahead of the road vehicle 1. In particular, the change in the colour of the backlight of the control panel 7 and of the ambient light of the passenger compartment 4 is very well perceived by the driver through his/her peripheral vision, even when he/she keeps his eyes fixed on the road ahead of the road vehicle 1.

Finally, the manual control 21 described above is simple and economic to be manufactured, as it uses components that can be easily found in the market.

LIST OF THE REFERENCE NUMBERS OF THE FIGURES

1 road vehicle
2 front wheels
3 rear wheels
4 passenger compartment
5 dashboard
6 windshield
7 control panel
8 steering wheel
9 front wheels
10 accelerator pedal
11 brake pedal
12 transmission control
13 light indicator
14 screen
15 selector
16 backlighting system
17 ambient lighting system
18 roof
19 electronic control unit
20 launch control procedure
21 manual control
22 support
23 seat
24 symmetry axis
25 control body
26 handle
27 light element
28 power supply wire
29 holding system
30 permanent magnet
31 permanent magnet
32 limit stop
33 sensor
34 elastic element
35 lever
36 rotation axis
37 light element

The invention claimed is:

1. A road vehicle (1) comprising:

a passenger compartment (4) delimited by a roof (18) at the top;

at least one front seat (9) arranged in the passenger compartment (4);

an accelerator pedal (10);

a brake pedal (11);

a control unit (19), which implements a launch control procedure (20); and a manual control (21), which can be operated to carry out the activation of the launch control procedure (20) and is arranged on the roof (18);

wherein the manual control (21) is configured to be activated by means of a vertical movement from the top to the bottom;

wherein the manual control (21) comprises a support (22) having a seat (23) and a control body (25), which is accommodated in the seat (23) in a movable manner so as to be moved between a deactivated position, in which the launch control procedure (20) cannot be activated, and an active position, in which the launch control procedure (20) can be activated;

wherein the control body (25) linearly translates by means of the vertical movement from the top to the bottom from the deactivated position to the active position, in which the control body (25) is at least partially extracted from the seat (23);

wherein the control body (25) comprises a handle (26), which can be grabbed and can be pulled in order to extract the control body (25) from the seat (23), thus moving the control body (25) from the deactivated position to the active position.

2. The road vehicle (1) according to claim 1, wherein the manual control (21) comprises a holding system (29), which holds the control body (25) in the deactivated position with a predetermined force.

3. The road vehicle (1) according to claim 1, wherein the support (22) of the manual control (21) is configured to be mounted horizontally, so that the control body (25) linearly translates between the deactivated position and the active position by means of a vertical movement from the top to the bottom.

4. The road vehicle (1) according to claim 1, wherein the manual control (21) is collapsible, thus allowing the control body (25) to completely get into the seat (23).

5. The road vehicle (1) according to claim 1, wherein the control unit (19) is configured to activate the launch control procedure (20) by carrying out the following operations in this exact order:

when the road vehicle (1) is parked, pressing the brake pedal (11) all the way down;

continuously activating the manual control (21) for a predetermined amount of time; and pressing the accelerator pedal (10) all the way down.

6. The road vehicle (1) according to claim 1, wherein:

a control panel (7) is provided, which is equipped with a backlighting system (16); and the control unit (19) is configured to signal the activation of the launch control procedure (20) by changing a colour of a backlight of the control panel (7).

7. The road vehicle (1) according to claim 1, wherein:

an ambient lighting system for the passenger compartment (4) is provided; and the control unit (19) is configured to signal the activation of the launch control procedure (20) by changing a colour of an ambient light of the passenger compartment (4).

8. The road vehicle (1) according to claim 1, wherein:

the control body (25) comprises a light element (27), which is arranged in the area of a side wall of the control body (25) and is on the outside of the seat (23) only when the control body (25) is in the active position and is at least partially extracted from the seat (23);

when the control body (25) is in the deactivated position, the light element (27) is completely hidden inside the seat (23); and the control unit (19) is configured to switch on the light element (27) to emit light only when the control body (25) is in the active position and (6) and is at least partially extracted from the seat (23).

9. The road vehicle (1) according to claim 8, wherein the light element (27) has an annular shape completely surrounding the control body (25).

10. A road vehicle (1) comprising:

a passenger compartment (4) delimited by a roof (18) at the top;

an ambient lighting system (17) configured to generate an ambient light throughout the passenger compartment (4);

a steering wheel (8);

at least one front seat (9) arranged in the passenger compartment (4);

a control panel (7), which is arranged behind the steering wheel (8) and is provided with a backlighting system (16);

an ambient lighting system for the passenger compartment (4);

an accelerator pedal (10);

a brake pedal (11);

a control unit (19), which implements a launch control procedure (20); and a manual control (21), which can be operated to carry out the activation of the launch control procedure (20) and is located outside the control panel (7) at a certain distance from the control panel (7);

wherein the control unit (19) is configured to signal the activation of the launch control procedure (20) by changing a colour of a backlight of the control panel (7) and/or by changing a colour of the ambient light of the passenger compartment (4).

11. The road vehicle (1) according to claim 10, wherein the control unit (19) is configured to signal the activation of the launch control procedure (20) only by changing the colour of the backlight of the control panel (7).

12. The road vehicle (1) according to claim 10, wherein the control unit (19) is configured to signal the activation of the launch control procedure (20) only by changing the colour of the ambient light of the passenger compartment (4).

13. The road vehicle (1) according to claim 10, wherein the control unit (19) is configured to signal the activation of the launch control procedure (20) by changing the colour of the backlight of the control panel (7) and by changing the colour of the ambient light of the passenger compartment (4).

14. The road vehicle (1) according to claim 10, wherein the manual control (21) is arranged on the roof (18).

15. The road vehicle (1) according to claim 14, wherein the manual control (21) is configured to be activated by means of a vertical movement from the top to the bottom.

16. The road vehicle (1) according to claim 15, wherein the manual control (21) comprises a support (22) having a seat (23) and a control body (25), which is accommodated in the seat (23) in a movable manner so as to be moved between a deactivated position, in which the launch control procedure (20) cannot be activated, and an active position, in which the launch control procedure (20) can be activated.

17. The road vehicle (1) according to claim 16, wherein the control body (25) linearly translates by means of the vertical movement from the top to the bottom from the deactivated position to the active position, in which the control body (25) is at least partially extracted from the seat (23).

18. The road vehicle (1) according to claim 17, wherein the control body (25) comprises a handle (26), which can be grabbed and can be pulled in order to extract the control body (25) from the seat (23), thus moving the control body (25) from the deactivated position to the active position.

19. The road vehicle (1) according to claim 16, wherein:

the control body (25) comprises a light element (27), which is arranged in the area of a side wall of the control body (25) and is on the outside of the seat (23) only when the control body (25) is in the active position and is at least partially extracted from the seat (23);

when the control body (25) is in the deactivated position, the light element (27) is completely hidden inside the seat (23); and the control unit (19) is configured to switch on the light element (27) to emit light only when the control body (25) is in the active position and (6) and is at least partially extracted from the seat (23).

* * * * *